(12) United States Patent
Kong et al.

(10) Patent No.: US 12,266,801 B2
(45) Date of Patent: Apr. 1, 2025

(54) ACTIVE MATERIAL COMPONENT OF A COMPOSITION FOR FORMING AN ELECTRODE OF A BATTERY IN A DRY PROCESS AND A METHOD OF FORMING THE ELECTRODE

(71) Applicant: GM GLOBAL TECHNOLOGY OPERATIONS LLC, Detroit, MI (US)

(72) Inventors: Dewen Kong, Shanghai (CN); Meiyuan Wu, Shanghai (CN); Si Chen, Shanghai (CN); Haijing Liu, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 517 days.

(21) Appl. No.: 17/737,084

(22) Filed: May 5, 2022

(65) Prior Publication Data

US 2023/0290953 A1    Sep. 14, 2023

(30) Foreign Application Priority Data

Mar. 9, 2022    (CN) .......................... 202210228876.6

(51) Int. Cl.
*H01M 4/62*    (2006.01)
*H01M 4/02*    (2006.01)
(52) U.S. Cl.
CPC ...... *H01M 4/625* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 2012/0135309 A1* | 5/2012 | Kim | H01M 4/136 429/231.95 |
| 2012/0241666 A1 | 9/2012 | Hong | |
| 2019/0115591 A1* | 4/2019 | Zhamu | H01M 4/60 |

FOREIGN PATENT DOCUMENTS

| | | |
|---|---|---|
| JP | 2013127872 A | 6/2013 |
| KR | 1020130085915 A | 7/2013 |

OTHER PUBLICATIONS

Machine Translation of Japanese Publication No. 2013127872 (Year: 2013).*

* cited by examiner

*Primary Examiner* — Wyatt P McConnell
(74) *Attorney, Agent, or Firm* — Quinn IP Law

(57) ABSTRACT

An active material component of a composition for forming an electrode of a battery in a dry process is provided. The active material component includes a dry powder including a plurality of grains of an active material. The active material component further includes an electrically conductive filler material attached to each of the plurality of grains.

16 Claims, 4 Drawing Sheets

ACTIVE MATERIAL COMPONENT OF A COMPOSITION FOR FORMING AN ELECTRODE OF A BATTERY IN A DRY PROCESS AND A METHOD OF FORMING THE ELECTRODE

CROSS REFERENCE TO RELATED APPLICATIONS

This disclosure claims priority to China Patent Application 202210228876.6 filed on Mar. 9, 2022, which is hereby incorporated by reference.

INTRODUCTION

The disclosure generally relates to an active material component of a composition for forming an electrode of a battery in a dry process and a method of forming the electrode.

A battery cell includes an anode, a cathode, a separator, and an electrolyte solution. The anode and the cathode are electrodes. Electrodes may include a conductive current collector and may further include a coating including an active material configured for enabling a current flow to terminals of the battery cell.

SUMMARY

An active material component of a composition for forming an electrode of a battery in a dry process is provided. The active material component includes a dry powder including a plurality of grains of an active material. The active material component further includes an electrically conductive filler material attached to each of the plurality of grains.

In some embodiments, the electrically conductive filler material includes a long chain-type electrically conductive filler material.

In some embodiments, the long chain-type electrically conductive filler material includes a carbon nanotube.

In some embodiments, the carbon nanotube is selected from the group consisting of a single walled carbon nanotube and a multi walled carbon nanotube.

In some embodiments, the electrically conductive filler material is a first electrically conductive filler material. The active material component further includes a second electrically conductive filler material.

In some embodiments, the second electrically conductive filler material includes a particle-type electrically conductive filler material.

In some embodiments, the particle-type electrically conductive filler material includes carbon black.

In some embodiments, the second electrically conductive filler material includes a platelike-type electrically conductive filler material.

In some embodiments, the platelike-type electrically conductive filler material is selected from the group consisting of graphene and graphene nano plates.

In some embodiments, the second electrically conductive filler material includes a non-carbon electrically conductive material.

In some embodiments, the non-carbon electrically conductive material is selected from the group consisting of simple oxides and superconductive oxides.

In some embodiments, the electrically conductive filler material is present in the active material component in an amount from 0.01 part by weight to 15 parts by weight based on 100 parts by weight of the active material component.

In some embodiments, the electrically conductive filler material is present in the active material component in an amount from 0.5 parts by weight to 5 parts by weight based on 100 parts by weight of the active material component.

In some embodiments, each of the plurality of grains of the active material is a material selected from the group consisting of an olivine compound, a rock salt, cobalt-free layered oxide, a rock salt layered oxide, a spinel, a tavorite, a borate, a silicate, and an organic compound.

In some embodiments, each of the plurality of grains of the active material includes two materials selected from the group consisting of an olivine compound, a rock salt, cobalt-free layered oxide, a rock salt layered oxide, a spinel, a tavorite, a borate, a silicate, and an organic compound. A surface of the plurality of grains of the active material is coated with a doping material selected from the group consisting of aluminum, boron, copper, chromium, gallium, lanthanum, molybdenum, magnesium, niobium, phosphorus, rhodium, ruthenium, scandium, strontium, antimony, silicon, tin, titanium, tungsten, vanadium, yttrium, zinc, and zirconium.

In some embodiments, each of the plurality of grains of the active material is a material selected from the group consisting of a carbon-based anode material, a silicon-based anode material, a lithiated silicon material, a tin metal, a tin alloy, a lithium titanium oxide, a metal oxide, and a metal sulfide.

In some embodiments, each of the plurality of grains of the active material includes two materials selected from the group consisting of a carbon-based anode material, a silicon-based anode material, a lithiated silicon material, a tin metal, a tin alloy, a lithium titanium oxide, a metal oxide, and a metal sulfide.

According to one alternative embodiment, a method of forming an electrode for a battery is provided. The method includes mixing together a powder including a plurality of grains of an active material and an electrically conductive filler material. Mixing the powder and the electrically conductive filler material forms a plurality of active material particles, each coated with the electrically conductive filler material. The method further includes drying the plurality of active material particles and coating a substrate with the plurality of active material particles to thereby form the electrode.

In some embodiments, the method further includes mixing together the electrically conductive filler material and a second electrically conductive filler material to form an electrically conductive filler material mixture and mixing the powder and the electrically conductive filler material mixture to form the plurality of active material particles.

In some embodiments, the electrically conductive material includes a long chain-type electrically conductive filler material.

The above features and advantages and other features and advantages of the present disclosure are readily apparent from the following detailed description of the best modes for carrying out the disclosure when taken in connection with the accompanying drawings.

DETAILED DESCRIPTION

Figure 1:
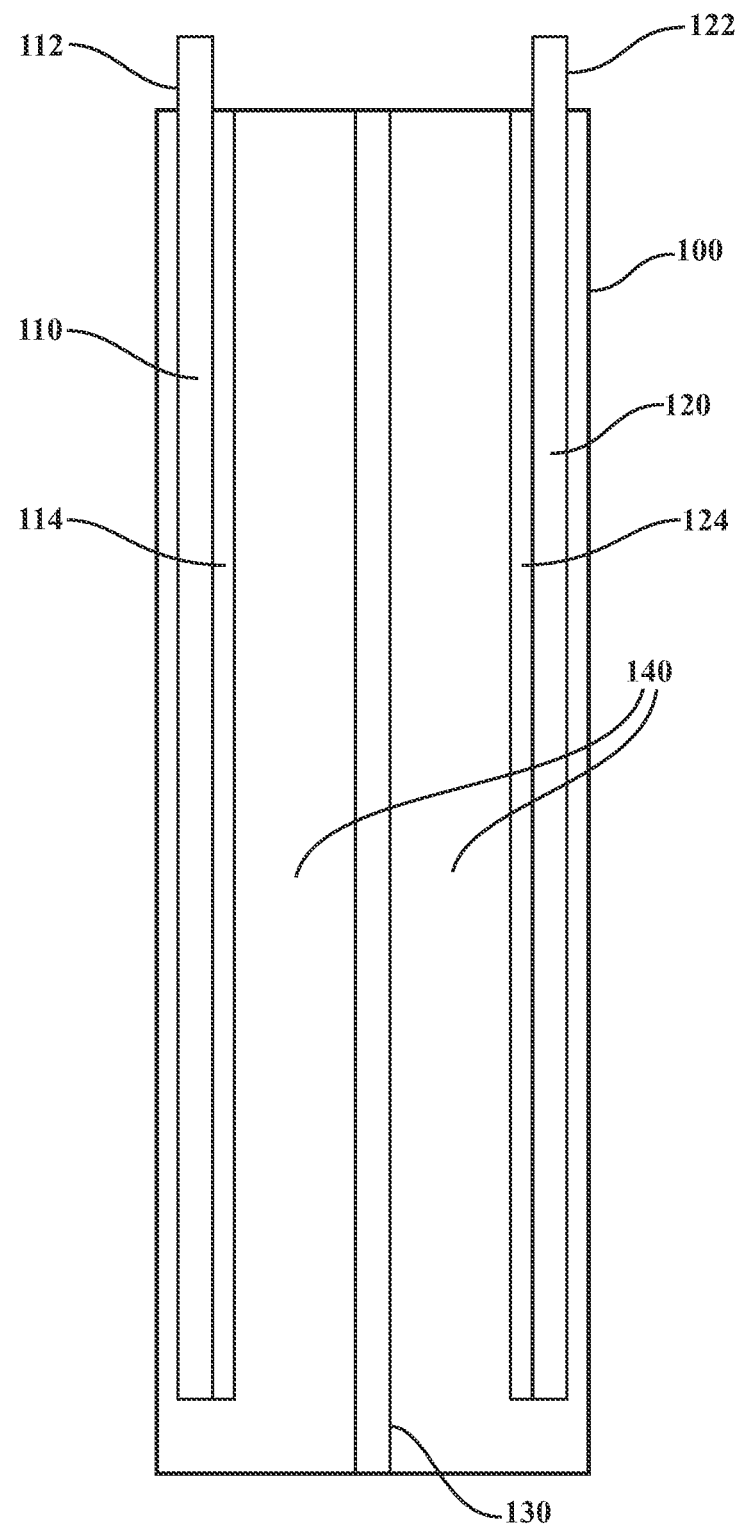
FIG. 1 schematically illustrates an exemplary battery cell, including an anode, a cathode, a separator, and an electrolyte composition, in accordance with the present disclosure.

A battery electrode may include a current collector, such as a metal foil substrate constructed of a conductive material such as copper or aluminum and may further include a coating configured to participate in a chemical reaction within the battery useful to create electrical energy. A coating of a battery electrode may include a composition of at least one active material and at least one filler or filler material. In one embodiment, an electrode may include the active material, a conductive carbon additive, and a binder.

Electrodes or relatively thin electrodes, excluding a thickness of a corresponding current collector, may include an exemplary thickness of 60-70 micrometers. A relatively thick or a thick electrode may be defined providing increased energy density for the electrode as compared to a relatively thin electrode. In one exemplary embodiment, a thick electrode may be configured for providing 5 milliamp hours per square centimeter of the electrode surface (5 milliamp hours per square centimeter is provided for an exemplary single-sided surface electrode or an electrode with a coating on one side). The additional thickness of the electrode including the additional active materials provided within the thickness enables the electrode to deliver the increased energy density. The thickness of the thick electrode may differ based upon active materials in the electrode, with $LiNi_{0.8}Co_{0.1}Mn_{0.1}O_2$ (NCM811) including an exemplary thickness of 130 micrometers and with lithium manganese iron phosphate (LMFP) including an exemplary thickness of 250 micrometers. In one embodiment, a thick electrode may be defined by the increased energy density it provides. The disclosed dry process enabled to create electrodes including a PTFE binder includes advantages as described according to the disclosure.

A dry process to create a coating upon an electrode may provide an excellent coating while avoiding use of a solvent and time and energy incurred in drying a wet mixture. The dry process to create electrodes includes a process combining active materials and filler materials without solvents. Components of the coating to be applied are mixed and applied to a current collector at relatively high temperature and pressure. In one exemplary embodiment, a polytetrafluoroethylene (PTFE) may be utilized in accordance with electrodes created through a dry process, creating a three dimensional binder bonding network to host the active material and conductive carbon fillers. The dry process may include a less homogeneous coating, with conductive carbon agglomerating within a binder network prior to the binder adhering to active material particles. Such an agglomeration of the conductive carbon with the binder prior to being applied to the active material particles may result in reduced binder efficiency and reduced uniformity of the coating material. Such a coating material with reduced binder binding efficiency and uniformity may reduce the electrochemical performance and mechanical robust of the electrode.

An active material particle including conductive filler materials pre-embedded upon the active material particle or a pre-embedded active material is provided. The active material particle includes a grain of the active material embedded with one or more electrically conductive filler materials. The disclosed pre-embedded active material may be utilized within a dry process to create electrodes. The disclosed material includes uniform distribution of conductive filler materials, reduces agglomeration of conductive carbon in a binder network, and improves the binder binding efficiency. Additionally, as a result of the solvent free electrode fabrication process, the pre-embedded carbon filler will not split off during the dry mixing process and following electrode forming step. According to one exemplary composition, the disclosed pre-embedded active material may be utilized to create a thick electrode with a dry process with increased uniformity and without an addition of additional conductive filler materials.

In one embodiment, the pre-embedded active material may include one pre-embedded conductive filler material. The one pre-embedded conductive filler material, in one embodiment, may be carbon nanotubes. In another embodiment, the pre-embedded active material may include a plurality of pre-embedded conductive filler materials, for example, including carbon nanotubes and Super P®.

The electrically conductive filler material may include a long chain-type electrically conductive filler material. The long chain-type electrically conductive filler material may include a carbon nanotube. The carbon nanotube may be selected from the group consisting of a single walled carbon nanotube and a multi walled carbon nanotube.

The electrically conductive filler material may be a first electrically conductive filler material. The active material component may further include a second electrically conductive filler material. The second electrically conductive filler material may include a particle-type electrically conductive filler material. The particle-type electrically conductive filler material may include carbon black. The second electrically conductive filler material may include a plate-like-type electrically conductive filler material. The plate-like-type electrically conductive filler material may be selected from the group consisting of graphene and graphene nano plates. The second electrically conductive filler material may include a non-carbon electrically conductive material. The non-carbon electrically conductive material may be selected from the group consisting of simple oxides and superconductive oxides.

The disclosed pre-embedded active material particle may be utilized to create a thick electrode with a dry process, with a mass of the pre-embedded active material particles being applied with heat and pressure to a current collector to create a coated electrode. The mass of pre-embedded active material particles, prior to being utilized in the dry process, may be created in a wet process, with a slurry of conductive filler materials being applied to an active material powder. The slurry and the active material powder may be mixed and dried. Once dried, the active material is coated with embedded conductive filler material particles and is ready to be used in a dry process to create an electrode.

In an alternative to a wet process to create the pre-embedded active material particles, a dry process to create the pre-embedded active material particles is provided. In one example, a mixture of conductive filler materials may be embedded upon active material particles in a fusion coating machine. One non-limiting, exemplary embodiment of a fusion coating machine includes the Mechano Fusion system available through Hosokawa Micron Powder Systems of Summit, New Jersey.

The electrode produced by the disclosed methods may be a cathode. Exemplary active materials or positive electroactive materials that may be utilized within a cathode may be selected from an olivine compound, a rock salt, cobalt-free layered oxide, a rock salt layered oxide, a spinel, a tavorite, a borate, a silicate, an organic compound, other types of positive electrode materials, or any combination thereof. The olivine compound may include $LiV_2(PO_4)_3$, $LiFePO_4$ (LFP), $LiCoPO_4$, and/or a lithium manganese iron phosphate (LMFP), by way of example. LMFPs may include $LiMnFePO_4$ and/or $LiMn_xFe_{1-x}PO_4$, where $0 \leq x \leq 1$, by way of example. Examples of $LiMn_xFe_{1-x}PO_4$, where $0 \leq x \leq 1$, include $LiMn_{0.7}Fe_{0.3}PO_4$, $LiMn_{0.6}Fe_{0.4}PO_4$, $LiMn_{0.8}Fe_{0.2}PO_4$, and $LiMn_{0.75}Fe_{0.25}PO_4$, by way of example. The rock salt, cobalt-free layered oxide may include $LiNi_xMn_{1-x}O_2$ (e.g., $LiNi_{0.75}Mn_{0.25}O_2$ NM75) and/or $LiNi_xMn_yAl_{1-x-y}O_2$ (e.g., $LiNi_{0.94}Mn_{0.04}Al_{0.02}O_2$ NMA), by way of example. The rock salt layered oxide may include $LiNi_xMn_yCo_{1-x-y}O_2$, $LiNi_xMn_{1-x}O_2$, $Li_{1+x}MO_2$, (e.g., $LiCoO_2$, $LiNiO_2$, $LiMnO_2$, and/or $LiNi_{0.5}Mn_{0.5}O_2$), a lithium nickel manganese cobalt oxide (NMC) (e.g., NMC 111, NMC 523, NMC 622, NMC 721, and/or NMC 811), a lithium nickel manganese cobalt aluminum oxide (NMCA), and/or a lithium nickel cobalt aluminum oxide (NCA), by way of example. The spinel may include $LiMn_2O_4$ and/or $LiNi_{0.5}Mn_{1.5}O_4$, by way of example. The tavorite compound may include $LiVPO_4F$, by way of example. The borate compound may include $LiFeBO_3$, $LiCoBO_3$, and/or $LiMnBO_3$, by way of example. The silicate compound may include $Li_2FeSiO_4$, $Li_2MnSiO_4$, and/or $LiMnSiO_4F$, by way of example. The organic compound may include dilithium (2,5-dilithiooxy)terephthalate (as described in, incorporated herein by reference in its entirety), and/or polyimide, by way of example. An example of another type of positive electroactive material is sulfur or a sulfur-containing material.

Some positive electroactive materials, such as olivine compounds, rock salt, cobalt-free layered oxides, rock salt layered oxides, and/or spinels, may be a coated and/or doped. Dopants may include aluminum, boron, copper, chromium, gallium, lanthanum, molybdenum, magnesium, niobium, phosphorus, rhodium, ruthenium, scandium, strontium, antimony, silicon, tin, titanium, tungsten, vanadium, yttrium, zinc, and zirconium, and the like. In certain aspects, a positive electroactive material including an LMFP compound may be doped with about 10% by weight of one or more dopants.

Exemplary active materials that may be utilized in a cathode including pre-embedded active material particles alternatively include combinations of any of rock salt layered oxides, spinel cathode materials, olivine compounds, and tavorite compounds, or other materials described herein.

Each of the plurality of grains of the active material may be a material selected from the group consisting of an olivine compound, a rock salt, cobalt-free layered oxide, a rock salt layered oxide, a spinel, a tavorite, a borate, a silicate, and an organic compound.

Each of the plurality of grains of the active material may include two materials selected from the group consisting of an olivine compound, a rock salt, cobalt-free layered oxide, a rock salt layered oxide, a spinel, a tavorite, a borate, a silicate, and an organic compound. A surface of the plurality of grains of the active material may be coated with a doping material, such as aluminum, boron, copper, chromium, gallium, lanthanum, molybdenum, magnesium, niobium, phosphorus, rhodium, ruthenium, scandium, strontium, antimony, silicon, tin, titanium, tungsten, vanadium, yttrium, zinc, and zirconium.

The electrode produced by the disclosed methods may be an anode. Exemplary active materials or negative electroactive materials that may be utilized in an anode may be selected from a carbonaceous material (e.g., carbon nanotubes (CNT), graphite and/or graphene), a lithium-containing material (e.g., lithium and/or a lithium alloy), a tin-containing material (e.g., tin and/or a tin alloy), a lithium titanium oxide (e.g., $Li_4Ti_5O_{12}$), a metal oxide (e.g., $V_2O_5$, $SnO_2$, and/or $Co_3O_4$), a metal sulfide (e.g., FeS), a silicon-containing material (e.g., silicon, silicon oxide, a silicon alloy, silicon-graphite silicon oxide graphite, and/or silicon alloy graphite, any of which may optionally be lithiated), or any combination thereof.

Exemplary active materials that may be utilized in an anode including pre-embedded active material particles alternatively include combinations of any of carbon-based anode materials, silicon and lithiated silicon materials, tin metal and tin alloy, lithium titanium oxide, metal oxides, and metal sulfides, or other materials described herein.

Use of the disclosed process to create pre-embedded active material particles for use in a dry process to create thick electrodes results in excellent homogeneity in the electrodes, avoiding high carbon agglomeration and providing excellent conductivity ratios.

Each of the plurality of grains of the active material may be a material selected from the group consisting of a carbon-based anode material, a silicon-based anode material, a lithiated silicon material, a tin metal, a tin alloy, a lithium titanium oxide, a metal oxide, and a metal sulfide.

Each of the plurality of grains of the active material may include two materials selected from the group consisting of a carbon-based anode material, a silicon-based anode material, a lithiated silicon material, a tin metal, a tin alloy, a lithium titanium oxide, a metal oxide, and a metal sulfide.

An active material component of a composition for forming an electrode of a battery in a dry process is provided. The active material component includes a dry powder including a plurality of grains of an active material. The active material component further includes an electrically conductive filler material attached to each of the plurality of grains.

The electrically conductive filler material may include a long chain-type electrically conductive filler material.

The long chain-type electrically conductive filler material may include a carbon nanotube.

The carbon nanotube may be selected from the group consisting of a single walled carbon nanotube and a multi walled carbon nanotube.

The electrically conductive filler material may be a first electrically conductive filler material. The active material component further includes a second electrically conductive filler material.

The second electrically conductive filler material may include a particle-type electrically conductive filler material.

The particle-type electrically conductive filler material may include carbon black.

The second electrically conductive filler material may include a platelike-type electrically conductive filler material.

The platelike-type electrically conductive filler material may be selected from the group consisting of graphene and graphene nano plates.

The second electrically conductive filler material may include a non-carbon electrically conductive material.

The non-carbon electrically conductive material may be selected from the group consisting of simple oxides and superconductive oxides.

The electrically conductive filler material may be present in the active material component in an amount from 0.01 part by weight to 15 parts by weight based on 100 parts by weight of the active material component.

The electrically conductive filler material may be present in the active material component in an amount from 0.5 parts by weight to 5 parts by weight based on 100 parts by weight of the active material component.

Each of the plurality of grains of the active material may be a material selected from the group consisting of an olivine compound, a rock salt, cobalt-free layered oxide, a rock salt layered oxide, a spinel, a tavorite, a borate, a silicate, and an organic compound.

Each of the plurality of grains of the active material may include two materials selected from the group consisting of an olivine compound, a rock salt, cobalt-free layered oxide, a rock salt layered oxide, a spinel, a tavorite, a borate, a silicate, and an organic compound. A surface of the plurality of grains of the active material may be coated with a doping material selected from the group consisting of aluminum, boron, copper, chromium, gallium, lanthanum, molybdenum, magnesium, niobium, phosphorus, rhodium, ruthenium, scandium, strontium, antimony, silicon, tin, titanium, tungsten, vanadium, yttrium, zinc, and zirconium.

Each of the plurality of grains of the active material may be a material selected from the group consisting of a carbon-based anode material, a silicon-based anode material, a lithiated silicon material, a tin metal, a tin alloy, a lithium titanium oxide, a metal oxide, and a metal sulfide.

Each of the plurality of grains of the active material may include two materials selected from the group consisting of a carbon-based anode material, a silicon-based anode material, a lithiated silicon material, a tin metal, a tin alloy, a lithium titanium oxide, a metal oxide, and a metal sulfide.

According to one alternative embodiment, a method of forming an electrode for a battery is provided. The method includes mixing together a powder including a plurality of grains of an active material and an electrically conductive filler material. Mixing the powder and the electrically conductive filler material forms a plurality of active material particles, each coated with the electrically conductive filler material. The method further includes drying the plurality of active material particles and coating a substrate with the plurality of active material particles to thereby form the electrode.

The method further may include mixing together the electrically conductive filler material and a second electrically conductive filler material to form an electrically conductive filler material mixture and mixing the powder and the electrically conductive filler material mixture to form the plurality of active material particles.

The electrically conductive material may include a long chain-type electrically conductive filler material.

Referring now to the drawings, wherein like reference numbers refer to like features throughout the several views, FIG. 1 schematically illustrates an exemplary battery cell 100, including an anode 110, a cathode 120, a separator 130, and an electrolyte composition 140. The battery cell 100 enables converting electrical energy into stored chemical energy in a charging cycle, and the battery cell 100 enables converting stored chemical energy into electrical energy in a discharging cycle. The anode 110 includes a first current collector 112. The cathode 120 includes a second current collector 122. The separator 130 is operable to separate the anode 110 from the cathode 120 and to enable ion transfer through the separator 130. The electrolyte composition 140 is a liquid or gel that provides a lithium-ion conduction path between the anode 110 and the cathode 120.

The anode 110 includes a coating 114. The coating 114 may be constructed of graphite. The cathode 120 includes a coating 124. The coating 124 may be a composite material including an active material, a conductive filler material, and a binder. The coating 124 may include an active material constructed of a nickel-based substance. In one embodiment, the coating 124 may include an active material constructed of a lithium nickel cobalt manganese aluminum oxide (NCMA) substance.

Figure 2:
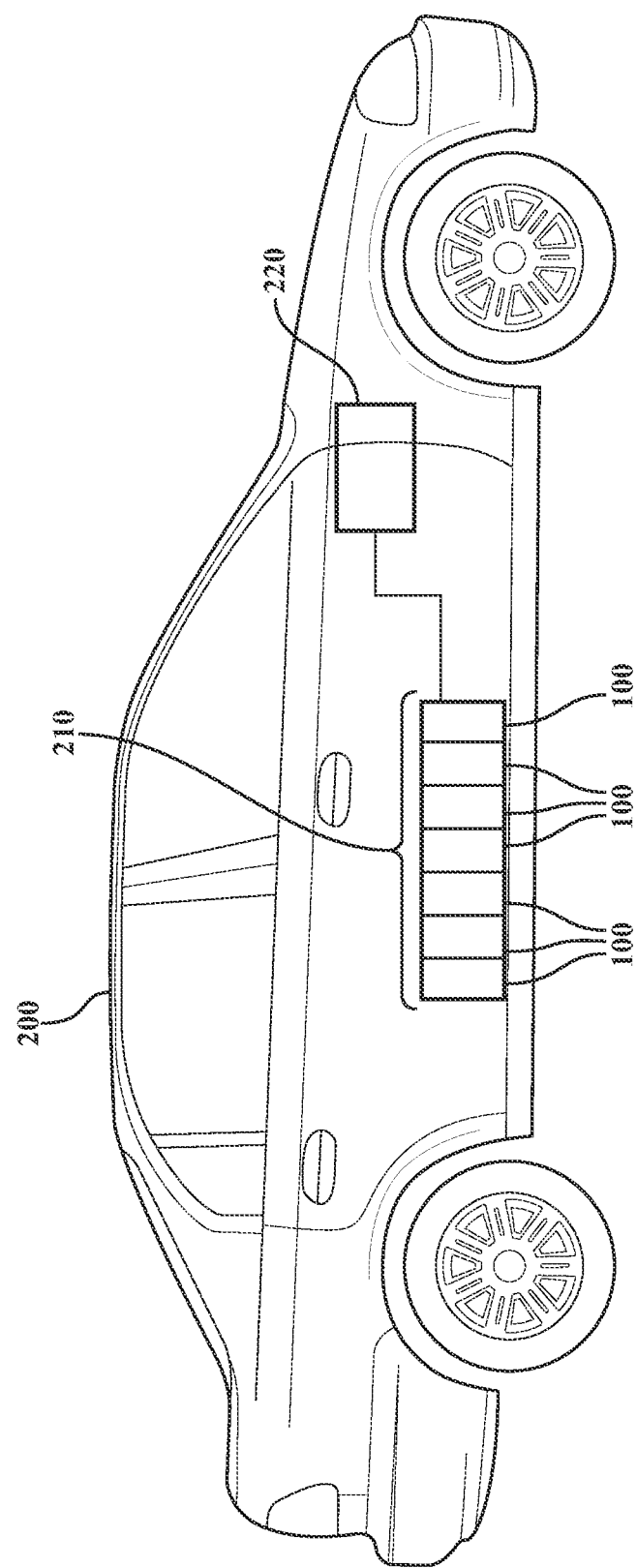
FIG. 2 schematically illustrates an exemplary device including a battery pack that includes a plurality of the battery cells of FIG. 1, in accordance with the present disclosure.

The battery cell 100 may be utilized in a wide range of applications and powertrains. FIG. 2 schematically illustrates an exemplary device 200, e.g., a battery electric vehicle (BEV), including a battery pack 210 that includes a plurality of battery cells 100. The plurality of battery cells 100 may be connected in various combinations, for example, with a portion being connected in parallel and a portion being connected in series, to achieve goals of supplying electrical energy at a desired voltage. The battery pack 210 is illustrated as electrically connected to a motor generator unit 220 useful to provide motive force to the vehicle 200. The motor generator unit 220 may include an output component, for example, an output shaft, which provides mechanical energy useful to provide the motive force to the vehicle 200. A number of variations to vehicle 200 are envisioned, and the disclosure is not intended to be limited to the examples provided.

Figure 3:
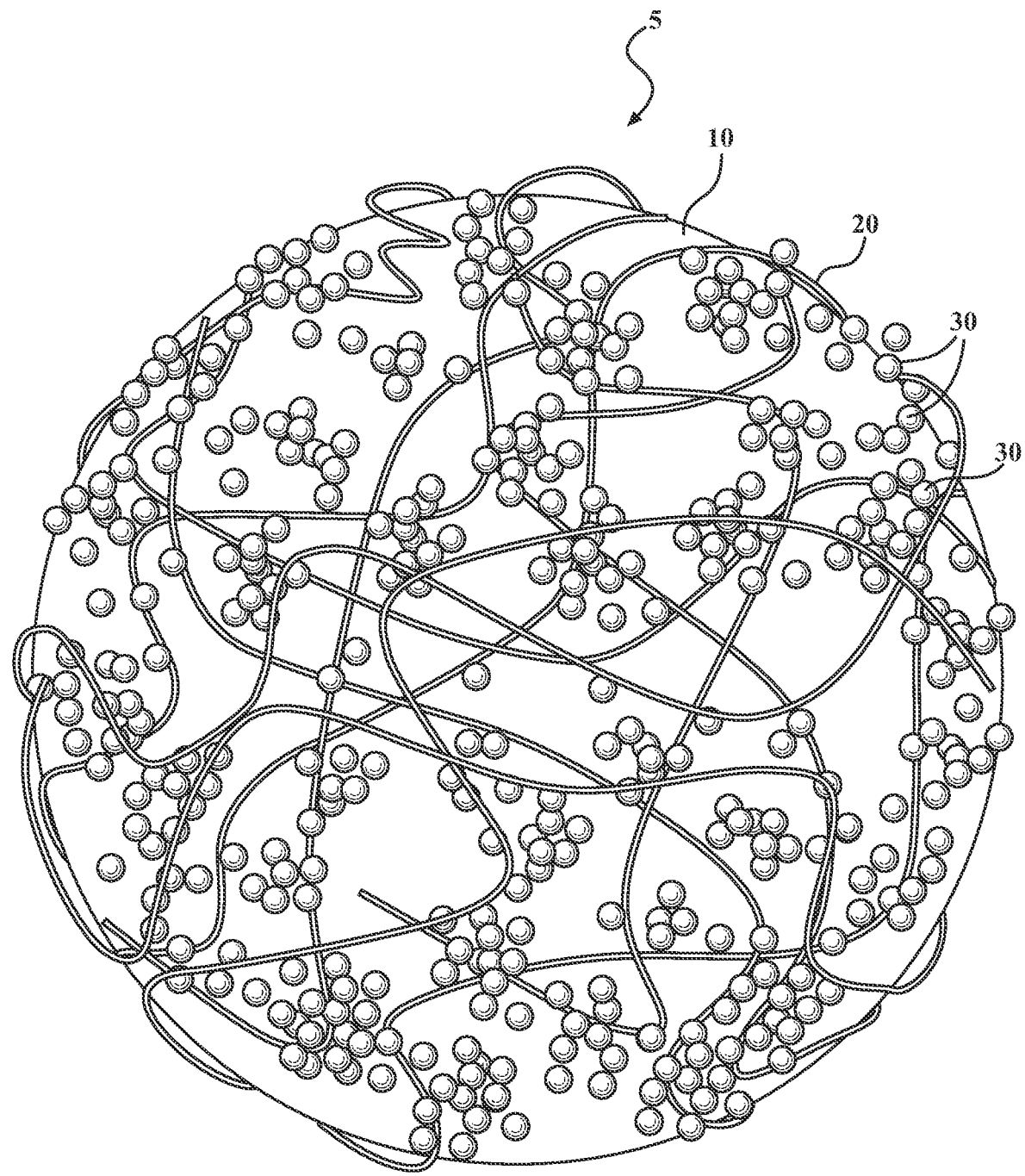
FIG. 3 schematically illustrates an active material particle pre-embedded with an electrically conductive filler material for use upon an electrode of a battery, in accordance with the present disclosure.

FIG. 3 schematically illustrates an active material particle 5 for an electrode of a battery cell 100 of FIG. 1, wherein the active material particle 5 includes a grain of the active material 10 pre-embedded with a particle-type electrically conductive filler material 30. The active material particle 10 further includes a long chain type conductive filler material 20 acting as an additional conductive filler material and acting to hold the active material particle 10 and the particle-type electrically conductive filler material 30 together.

The active material particle 10 may include an active material useful upon a cathode. In one embodiment, the active material may be nickel-based. In one embodiment, the active material may be NCMA.

The electrically conductive filler material 30 may include a carbon-based conductive filler material. A carbon-based conductive filler material may include particle-type conductive filler materials. Examples of particle-type conductive filler materials include carbon black, Super P® (SP) which is commercially available through Imerys Graphite & Carbon Switzerland SA, Bodio, Switzerland, and Ketjenblack® (KB) which is commercially available through Akzo Chemie Nederland B.V. Corporation, Amersfoort, Netherlands. A carbon-based conductive filler material may include long chain-type conductive filler materials. Long chain-type conductive filler materials may include carbon nanotubes (CNT), which may include single walled carbon nanotubes, multi walled carbon nanotubes, or vapor grown carbon nanofibers (VGCF). A carbon-based conductive filler material may include platelike-type conductive filler materials. Platelet-type conductive filler materials may include graphene or graphene nano plates.

The electrically conductive filler material 30 may alternatively include a non-carbon-based conductive filler material. A non-carbon-based conductive filler material may include metal oxides, such as simple oxides and superconductive oxides. Simple oxides may include ruthenium oxide ($RuO_2$), tin (IV) oxide ($SnO_2$), zinc oxide (ZnO), and germanium sesquioxide ($Ge_2O_3$). Superconductive oxides may include $YBa_2Cu_3O_7$ and $La_{0.75}Ca_{0.25}MnO_3$.

Pre-embedded conductive filler materials may be present in the disclosed pre-embedded active material in a range of concentrations. In one example, a pre-embedded conductive filler material may be present in a mass ratio of between 0.01% to 15% as compared to a mass of the active material. Described in another way, the electrically conductive filler material may be present in the active material component in an amount from 0.01 part by weight to 15 parts by weight based on 100 parts by weight of the active material component. In another example, a pre-embedded conductive filler material may be present in a mass ratio of between 0.5% to 5% as compared to a mass of the active material. Described in another way, the electrically conductive filler may be present in the active material component in an amount from 0.5 parts by weight to 5 parts by weight based on 100 parts by weight of the active material component. Selection of the mass ratio between the conductive filler material and the active material is a balance between increasing conductive ratio and reduced energy density that result from increasing presence of the conductive filler material.

Figure 4:
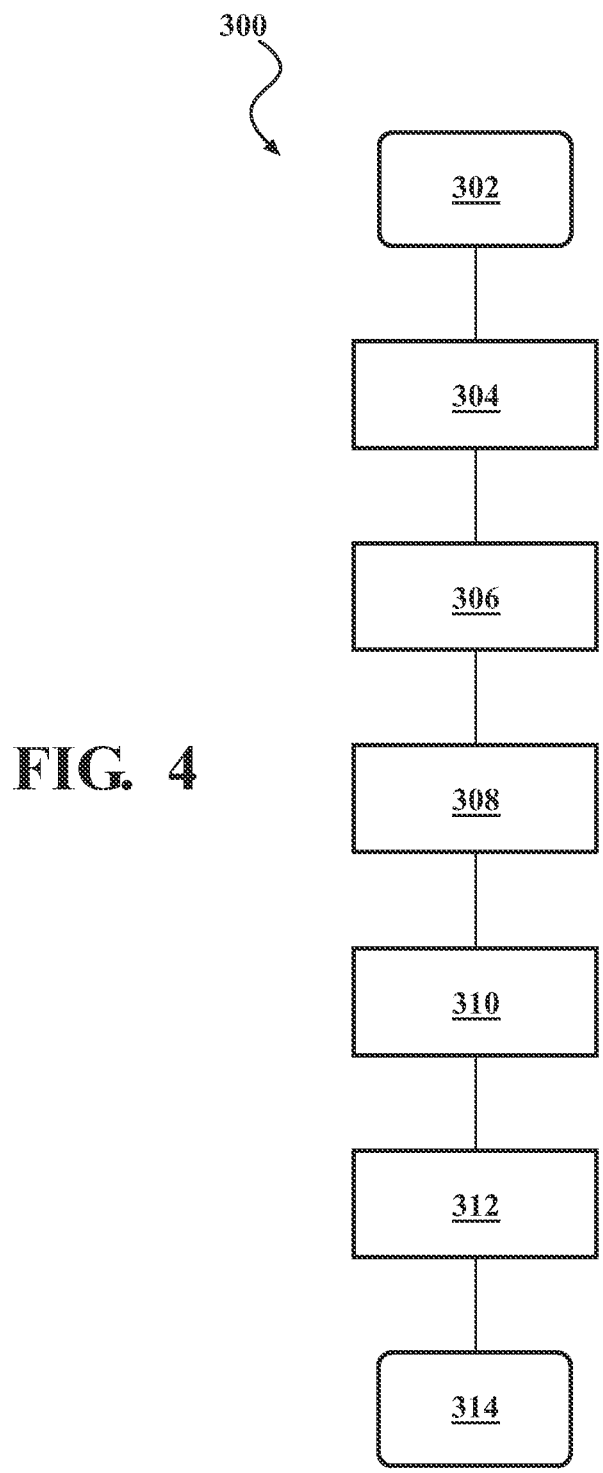
FIG. 4 is a flowchart illustrating an exemplary method to produce pre-embedded active material particles, in accordance with the present disclosure.

FIG. 4 is a flowchart illustrating an exemplary method 300 to produce pre-embedded active material particles. The method 300 starts at step 302. At step 304, an active material powder or a powder including grains of an active material is provided or prepared. At step 306, a conductive filler material mixture is prepared, which may include one type of conductive filler material, more than one type of conductive filler material, a conductive filler material that additionally functions as a binder, and/or a binder in addition to at least one type of conductive filler material. The conductive filler material mixture may be prepared through a wet process as a slurry or a dry process. At step 308, the active material powder is mixed with the conductive filler material slurry. At step 310, the mixture of the active material powder and the conductive filler material slurry are dried. At step 312, the pre-embedded active material particles are complete and may be utilized in other processes and methods. At step 314, the method 300 ends. A number of additional or alternative method steps are envisioned, and the disclosure is not intended to be limited to the examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. An active material component of a composition for forming an electrode of a battery in a dry process, the active material component comprising:
a dry powder including a plurality of grains of an active material; and
an electrically conductive filler material pre-embedded upon and attached to each of the plurality of grains;
wherein each of the plurality of grains of the active material includes two materials selected from the group consisting of an olivine compound, a rock salt, cobalt-free layered oxide, a rock salt layered oxide, a spinel, a tavorite, a borate, a silicate, and an organic compound;
wherein a surface of the plurality of grains of the active material is coated with a doping material selected from the group consisting of aluminum, boron, copper, chromium, lanthanum, molybdenum, magnesium, niobium, phosphorus, rhodium, ruthenium, scandium, strontium, antimony, silicon, tin, titanium, tungsten, vanadium, yttrium, and zirconium; and
wherein the surface of the plurality of grains is doped with about 10% by weight of the doping material.

2. The active material component of claim 1, wherein the electrically conductive filler material includes a long chain-type electrically conductive filler material.

3. The active material component of claim 2, wherein the long chain-type electrically conductive filler material includes a carbon nanotube.

4. The active material component of claim 3, wherein the carbon nanotube is selected from the group consisting of a single walled carbon nanotube and a multi walled carbon nanotube.

5. The active material component of claim 2, wherein the electrically conductive filler material is a first electrically conductive filler material; and
wherein the active material component further includes a second electrically conductive filler material.

6. The active material component of claim 5, wherein the second electrically conductive filler material includes a particle-type electrically conductive filler material.

7. The active material component of claim 6, wherein the particle-type electrically conductive filler material includes carbon black.

8. The active material component of claim 5, wherein the second electrically conductive filler material includes a platelike-type electrically conductive filler material.

9. The active material component of claim 8, wherein the platelike-type electrically conductive filler material is selected from the group consisting of graphene and graphene nano plates.

10. The active material component of claim 5, wherein the second electrically conductive filler material includes a non-carbon electrically conductive material.

11. The active material component of claim 10, wherein the non-carbon electrically conductive material is selected from the group consisting of simple oxides and superconductive oxides.

12. The active material component of claim 1, wherein the electrically conductive filler material is present in the active material component in an amount from 0.01 part by weight to 15 parts by weight based on 100 parts by weight of the active material component.

13. The active material component of claim 1, wherein the electrically conductive filler material is present in the active material component in an amount from 0.5 parts by weight to 5 parts by weight based on 100 parts by weight of the active material component.

14. A method of forming an electrode for a battery, the method comprising:
mixing together:
a dry powder including a plurality of grains of an active material; and
an electrically conductive filler material pre-embedded upon and attached to each of the plurality of grains;
wherein mixing the dry powder and the electrically conductive filler material forms a plurality of active material particles;
wherein each of the plurality of grains of the active material includes two materials selected from the group consisting of an olivine compound, a rock salt, cobalt-free layered oxide, a rock salt layered oxide, a spinel, a tavorite, a borate, a silicate, and an organic compound;
wherein a surface of the plurality of grains of the active material is coated with a doping material selected from the group consisting of aluminum, boron, copper, chromium, lanthanum, molybdenum, magnesium, niobium, phosphorus, rhodium, ruthenium, scandium, strontium, antimony, silicon, tin, titanium, tungsten, vanadium, yttrium, and zirconium; and wherein the surface of the plurality of grains is doped with about 10% by weight of the doping material;

drying the plurality of active material particles; and coating a substrate with the plurality of active material particles to thereby form the electrode.

15. The method of claim 14, further comprising:

mixing together the electrically conductive filler material and a second electrically conductive filler material to form an electrically conductive filler material mixture; and mixing the dry powder and the electrically conductive filler material mixture to form the plurality of active material particles.

16. The method of claim 14, wherein the electrically conductive filler material includes a long chain-type electrically conductive filler material.

\* \* \* \* \*